(No Model.)
J. P. MASON & S. L. WIEGAND.
METHOD OF AND APPARATUS FOR MAKING NUTS AND WASHERS.
No. 444,918. Patented Jan. 20, 1891.
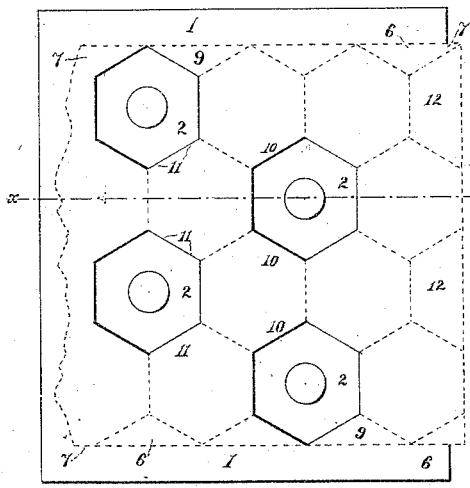
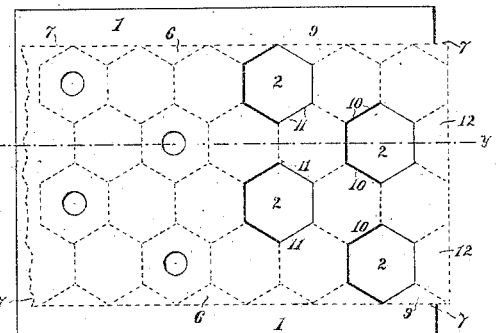
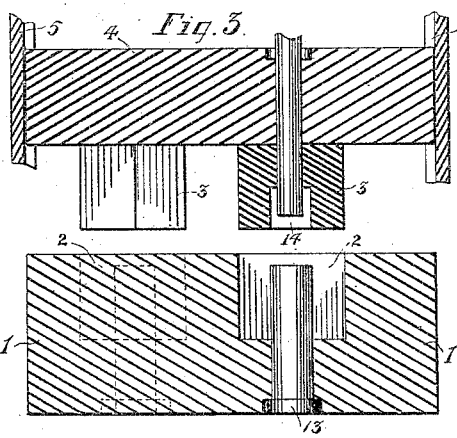
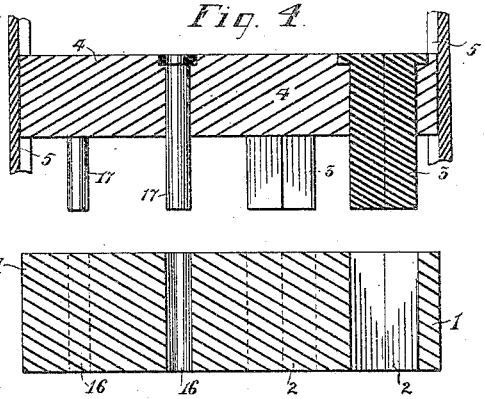
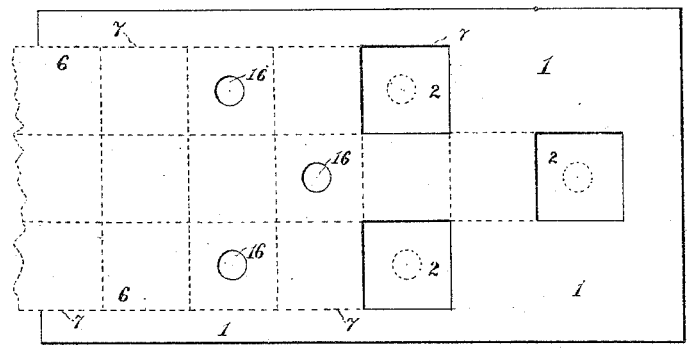
WITNESSES:
Percy A. Bivins
E. C. Paramore
INVENTORS
James P Mason
S Lloyd Wiegand
by S Lloyd Wiegand
atty

UNITED STATES PATENT OFFICE.

JAMES P. MASON, OF NORRISTOWN, AND S. LLOYD WIEGAND, OF PHILADELPHIA, PENNSYLVANIA; SAID WIEGAND ASSIGNOR TO SAID MASON.

METHOD OF AND APPARATUS FOR MAKING NUTS AND WASHERS.

SPECIFICATION forming part of Letters Patent No. 444,918, dated January 20, 1891.

Application filed August 20, 1890. Serial No. 362,563. (No model.)

*To all whom it may concern:*

Be it known that we, JAMES P. MASON, residing at Norristown, Montgomery county, Pennsylvania, and S. LLOYD WIEGAND, residing at Philadelphia, in the county of Philadelphia and State of Pennsylvania, both citizens of the United States, have invented certain new and useful Improvements in the Method of and Apparatus for Making Nuts and Washers; and we do hereby declare the following to be a sufficiently full, clear, and exact description thereof as to enable others skilled in the art to make and use the said invention.

This invention relates to the manufacture of nuts and washers and articles of similar form from plate metal; and it consists in the method of arranging the dies and punches for cutting the same and the manner of presenting plates of metal to the action of the punches and dies, so as to reduce the amount of scrap and thereby economize the metal requisite for their manufacture, and also to economize the power required for working the machine and to accelerate the rate of production.

The nature of this invention consists in the arrangement of the dies and punches whereby the sides of square and hexagonal washers and nuts cut by one set of punches leaves the plate from which it is cut so shaped that without further cutting of such surface forms the side of another nut cut subsequently from the plate, and when applied to making hexagon nuts and washers by arranging the dies and punches so that the sides of the hexagon nearest the margin of the plates are set at an angle of thirty degrees thereto, which arrangement, as is fully hereinafter explained, wastes but a very small proportion of material sidewise to become scrap, and the larger scraps occur only at the ends of the plate, as will fully hereinafter appear, and is illustrated in the accompanying drawings, in which—

Figure 1 shows a view of a die embodying this invention as applied to making hexagon washers, with a plate of metal laid thereon drawn in dotted lines, and with the position of the several washers in the plate also shown in dotted lines. Fig. 2 is a view of a die arranged for making hexagon nuts, with the position of the nuts in the plate and the outline of the plate indicated by dotted lines. Fig. 3 is a section in the plane indicated by the dotted line $x\ x$ in Fig. 1. Fig. 4 is a section of the plane indicated by the dotted line $y\ y$ in Fig. 2, and Fig. 5 a view of the die as arranged for making square nuts.

Referring to Figs. 1 and 3, 1 represents the die having openings 2 in it of the form of the outlines of the washers or nuts. 3 are the punches arranged to fit the openings 2 in the die 1. The punches 3 are held in a bed or chuck 4, reciprocating in suitable guides 5, so as to cut the washers out by piercing the plate 6 and forcing the washer into the openings 2. The form of machine preferable for this operation is that shown in A. J. Mason's application, No. 359,958, for United States Patent for a washer-machine, filed July 25, 1890; but any other kind of strong reciprocating piercing-press will answer. The press not being any part of this invention, the die-holder and punch-holder only are shown. The punches 3 and die-openings 2 are set so that the angles are presented toward the edges 7 of the sheet 8, and the sheet 8 is of such width that the edges 7 just cover the outer angles of die-openings 2, leaving scrap in the form of triangular pieces 9 at the side and the distance of the die-openings $2^a$ from the die-openings 2 such that when the plate 8 is moved after cutting the washer free the cut edges of the plate marked 11 11 11 will occupy the position marked 10 10 10 when the plate is moved in the direction to cut the next washer, so that the only waste of the plate laterally is at the edges of the plate in the form of the small triangular pieces 9. The centers or eyes of the washers are cut out by punches 13 working into dies 14 in the punches 3. At the ends of the plate the waste is in the form of the pieces marked 12, which, assuming the plate to be of proper length, will be one-half of a regular hexagon.

Referring to Figs. 3 and 4, the punches 3 and die-openings 2 are of the same form and relative arrangement as in Figs. 1 and 3, as is also the plate; but instead of perforating the nuts 16 with punches working into dies formed in the punches 3 a series of die-perforations 16 with corresponding punches 17 are employed, arranged so that holes cut in the plate by them will register centrally with the hexagon dies and punches as the plate is progressively moved in the line indicated by the arrow marked on the plate. It is requisite to cut center holes in the nut before severing them from the plate to avoid bursting of the nuts by the force requisite to expel the core from the central hole.

Referring to Fig. 5, the arrangement of punches 3 and dies is substantially the same as in Fig. 3, with the exception that two of the sides of the nut are parallel with the margin of the plate, and if the plate is in breadth an even multiple of the width of the nuts there is no scrap made, excepting that expelled from the eyes of the nuts. The dies are strengthened by reason of the extent of metal between the opening as compared with dies in which the nuts are cut in close contiguity to each other, and the plate of metal resists the expansive or lateral pressure resulting from the displacement or flow of metal in punching the eyes of the nuts, which would otherwise split the nuts if severed from the plates prior to piercing them.

Having described this invention, what I claim is—

1. In a machine for cutting hexagon nuts and washers or like shape, the method of arranging the dies so as to present angles to the side of the plate and produce triangular scrap, as described, and straight lines toward the end of the plate, and feeding the plate so that the cut opening will upon one or more of its sides coincide with the side of the washer next cut without intervening scraps, substantially as set forth.

2. In dies for making hexagon nuts from plates of metal, the punches and dies arranged in series, so as to place one nut with sides on the line of severance of preceding nuts in dies of the series, in combination with a second series of dies and punches adapted to punch the eyes of nuts from plate metal to centrally register with the series of hexagon dies for severance of the nuts from the plate, substantially as set forth.

3. In dies for simultaneously punching several nuts from the same plate of metal, the arrangement of dies in series or lines with intervening distances equal to the multiple of the breadth of the nuts, so that the cut surface left by the severance of one nut by progressively moving the plate between the punches and dies forms without further cutting a surface of another nut, cut subsequently from the plate, substantially as set forth.

JAMES P. MASON.
S. LLOYD WIEGAND.

Witnesses:
J. DANIEL EBY,
ALEX. H. SIEGEL